(12) United States Patent
Horiguchi

(10) Patent No.: US 11,472,963 B2
(45) Date of Patent: Oct. 18, 2022

(54) GLITTER PIGMENT, PIGMENT-CONTAINING COMPOSITION, AND PIGMENT-CONTAINING PAINTED PRODUCT

(71) Applicant: Nippon Sheet Glass Company, Limited, Tokyo (JP)

(72) Inventor: Haruko Horiguchi, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 243 days.

(21) Appl. No.: 16/606,088

(22) PCT Filed: Apr. 25, 2018

(86) PCT No.: PCT/JP2018/016858
§ 371 (c)(1),
(2) Date: Oct. 17, 2019

(87) PCT Pub. No.: WO2018/199182
PCT Pub. Date: Nov. 1, 2018

(65) Prior Publication Data
US 2020/0123387 A1    Apr. 23, 2020

(30) Foreign Application Priority Data
Apr. 28, 2017  (JP) .............................. JP2017-089625

(51) Int. Cl.
*C09C 1/00* (2006.01)
*C09D 5/29* (2006.01)

(52) U.S. Cl.
CPC .......... *C09C 1/0021* (2013.01); *C09C 1/0078* (2013.01); *C09D 5/29* (2013.01);
(Continued)

(58) Field of Classification Search
CPC ............. C01P 2006/62; C01P 2006/66; C08K 2003/0806; C09C 1/0021; C09C 1/0033;
(Continued)

(56) References Cited

U.S. PATENT DOCUMENTS 5,116,664 A * 5/1992 Kimura ................. C09C 1/0078
106/286.4
6,936,348 B1    8/2005 Yanagase
(Continued)

FOREIGN PATENT DOCUMENTS

EP    3546528    10/2019
JP    H0232170    2/1990
(Continued)

OTHER PUBLICATIONS

Extended European Search Report issued for European Patent Application No. 18791804.0, dated Jan. 14, 2021, 11 pages.
International Search Report and Written Opinion issued for International Patent Application No. PCT/JP2018/016858, dated Jul. 31, 2018, 10 pages including English translation of Search Report.

*Primary Examiner* — Shuangyi Abu Ali
(74) *Attorney, Agent, or Firm* — Hamre, Schumann, Mueller & Larson, P.C.

(57) ABSTRACT

The present invention provides a glitter pigment suitable for imparting high brightness to reflected light toward a regular reflection direction and reducing unnaturalness caused by an observation angle-dependent variation in reflected light. The glitter pigment according to the present invention includes: a flaky substrate; an optical interference film formed on a surface of the flaky substrate; and fine light scattering particles attached to the optical interference film, wherein reflected light is represented by an L*(15) value of more than 100, a ΔL*(h–s) value of less than 30, and a Δh(h–s) value of less than 40° in an L*C*h color system. The L*(15) value is an L* value of the reflected light toward a 15° direction based on an angular representation in which, when
(Continued)

an illuminant is disposed so that an incident angle is 45°, an angle at which light is regularly reflected is defined as 0° and a light incident direction is defined as positive. The $\Delta L^*$(h–s) value is a difference in $L^*$ between a highlight and shade, and the $\Delta h$(h–s) value is a difference in h between a highlight and shade. The $\Delta h$ value expressed in angle is an angular difference. The highlight is an average of values measured at 15° and 25°, and the shade is an average of values measured at 75° and 110°.

7 Claims, 1 Drawing Sheet

(52) U.S. Cl.
CPC ...... *C01P 2006/62* (2013.01); *C01P 2006/66* (2013.01); *C09C 2200/102* (2013.01); *C09C 2200/302* (2013.01); *C09C 2200/502* (2013.01)

(58) Field of Classification Search
CPC . C09C 1/006; C09C 1/0078; C09C 2200/102; C09C 2200/302; C09C 2200/502; C09D 5/29; C09D 5/36; C09D 7/61; C09D 7/70
See application file for complete search history.

(56) References Cited

U.S. PATENT DOCUMENTS

| | | |
|---|---|---|
| 2003/0147819 A1 | 8/2003 | Watanabe |
| 2008/0318012 A1 | 12/2008 | Domnick et al. |
| 2013/0131187 A1 | 5/2013 | Hashizume et al. |
| 2018/0155551 A1 | 6/2018 | Horiguchi et al. |

FOREIGN PATENT DOCUMENTS

| | | | | |
|---|---|---|---|---|
| JP | 2001031421 | | 2/2001 | |
| JP | 2001288038 | | 10/2001 | |
| JP | 2003002634 | | 1/2003 | |
| JP | 2003012962 | | 1/2003 | |
| JP | 2003212721 | | 7/2003 | |
| JP | 2006299051 | | 11/2006 | |
| JP | 2006299051 A | * | 11/2006 | ........... C09C 1/0078 |
| JP | 2008063525 | | 3/2008 | |
| JP | 2011190535 | | 9/2011 | |
| WO | 2010125885 | | 11/2010 | |
| WO | 2012014573 | | 2/2012 | |
| WO | 2016194352 | | 12/2016 | |

* cited by examiner

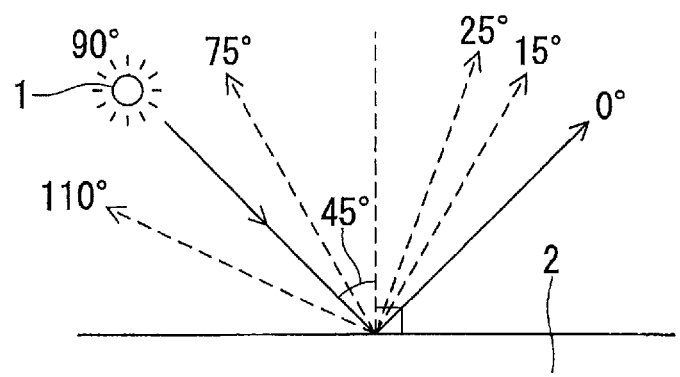

GLITTER PIGMENT, PIGMENT-CONTAINING COMPOSITION, AND PIGMENT-CONTAINING PAINTED PRODUCT

TECHNICAL FIELD

The present invention relates to glitter pigments, and particularly relates to a glitter pigment including a flaky substrate, optical interference film formed on the surface of the flaky substrate, and fine particles attached to the optical interference film. The present invention also relates to a composition containing a glitter pigment and to a painted product having a paint film containing a glitter pigment.

BACKGROUND ART

Glitter pigments are added to various products such as paints, cosmetics, and so on to allow the products to reflect light with sparkles. A typical property required of glitter pigments is high brightness. Glitter pigments each including a flaky substrate are suitable for achieving this desirable property. Glitter pigments each including an optical interference film present pearly gloss due to an optical interference effect. A typical optical interference film is a titanium oxide film. Glitter pigments allowed to present a desired color by attachment of fine metal particles are also known. Typical fine metal particles are fine gold particles presenting color by surface plasmon resonance.

It has been proposed to improve the vividness of reflected light by making interference color presented by an optical interference film and color presented by fine metal particles similar to each other. Patent Literature 1 discloses a red or yellow glitter pigment with improved vividness. Examples 1 to 4 of Patent Literature 1 disclose glitter pigments each including: a flaky substrate having a surface on which a titanium oxide film with a thickness at which interference color is red is formed; and red fine gold particles attached to the titanium oxide film. Example 5 of Patent Literature 1 discloses a glitter pigment including: a flaky substrate having a surface on which a titanium oxide film with a thickness at which interference color is yellow is formed; and yellow fine silver particles attached to the titanium oxide film.

Patent Literature 2 discloses a technique for enhancing the vividness of a blue or green reflected color by using fine gold particles which have been used as a red-color former. The glitter pigment of Patent Literature 2 includes: a titanium oxide film formed on the surface of a flaky substrate to have a thickness at which interference color is blue or green; and fine gold particles attached to the titanium oxide film and then heated to change the aggregation state. The heating changes the aggregation state of the fine gold particles, which thus become a color former that improves the vividness of a blue or green reflected light.

CITATION LIST

Patent Literature

Patent Literature 1: JP 2006-299051 A
Patent Literature 2: WO 2016/194352 A1

SUMMARY OF INVENTION

Technical Problem

Reflected color presented by glitter pigments and resulting from optical interference varies depending on the angle at which the glitter pigments are observed. For example, an optical interference film can be designed to be able to present a reflected color close to a human skin color in a direction of regular reflection of incident light. However, when a film including a glitter pigment including this optical interference film is observed from a different direction, a slightly greenish reflected color can sometimes be observed. Such a shift of color (which may hereinafter be referred to as "color shift") is desirably reduced because such a shift of color can be a cause of an unnatural impression in some applications typified by cosmetics.

In the case of glitter pigments in which fine metal particles are attached to an optical interference film, an observation angle-dependent color shift of reflected light is reduced thanks to colors of the fine metal particles. However, as disclosed in Patent Literatures 1 and 2, glitter pigments each including an optical interference film and fine metal particles have conventionally been designed with the aim of enhancing the vividness of reflected light in a regular reflection direction. Because of this, the brightness of reflected light from these glitter pigments greatly varies depending on the angle of observation. In this respect, the unnatural impression has not yet been removed sufficiently.

Therefore, the present invention aims to provide a glitter pigment suitable for imparting high brightness to reflected light toward a regular reflection direction and reducing the unnaturalness caused by an observation angle-dependent variation in reflected light.

Solution to Problem

The present invention provides a glitter pigment including:

a flaky substrate;

an optical interference film formed on a surface of the flaky substrate; and fine light scattering particles attached to the optical interference film, wherein reflected light, as measured using illuminant D65, is represented by an $L^*$ (15) value of more than 100, a $\Delta L^*$(h−s) value of less than 30, and a $\Delta h$(h−s) value of less than 40° in an $L^*C^*h$ color system, wherein the $L^*$(15) value is an $L^*$ value of the reflected light toward a 15° direction based on an angular representation in which, when the illuminant is disposed so that an incident angle of incident light from the illuminant is 45°, an angle at which the incident light is regularly reflected is defined as 0° and an incident direction of the incident light is defined as 90°, the $\Delta L^*$(h−s) value is a difference obtained by subtracting an average value $L^*$(s) of an $L^*$(75) value of the reflected light toward a 75° direction and an $L^*$ (110) value of the reflected light toward a 110° direction from an average value $L^*$ (h) of the $L^*$(15) value of the reflected light toward the 15° direction and an $L^*$(25) value of the reflected light toward a 25° direction when the directions are based on the angular representation, and the $\Delta h$ (h−s) value is an angular difference between an average value h (h), expressed in angle, of a h (15) value of the reflected light toward the 15° direction and a h (25) value of the reflected light toward the 25° direction and an average value h (s), expressed in angle, of a h (75) value of the reflected light toward the 75° direction and a h (110) value of the reflected light toward the 110° direction when the directions are based on the angular representation.

Advantageous Effects of Invention

The present invention provides a glitter pigment suitable for maintaining a brightness level of reflected light observed in a regular reflection direction and suitable for reducing an observation angle-dependent variation in reflected light, specifically, variations in brightness and color of reflected light.

BRIEF DESCRIPTION OF DRAWING

FIG. 1 is a diagram for describing an angular representation.

DESCRIPTION OF EMBODIMENTS

Hereinafter, the present invention will be described in detail. The following description is not intended to limit the present invention to specific embodiments.

A glitter pigment provided in the present embodiment includes: a flaky substrate; an optical interference film formed on a surface of the flaky substrate; and fine light scattering particles attached to the optical interference film. Hereinafter, a flaky substrate with an optical interference film that is formed on the surface of the flaky substrate and to which no fine light scattering particles are attached may be referred to as "substrate pigment."

(Flaky Substrate)

The flaky substrate is a fine, plate-like thin piece which can be called, for example, a scaly substrate. The flaky substrate is, for example, a glass flake, alumina flake, mica, talc, or sericite. The flaky substrate is preferably a glass flake, alumina flake, or mica. Mica may be natural mica or synthetic mica. Hereinafter, a glass flake, which is a particularly preferred flaky substrate, will be described.

The glass composition for forming a glass flake as the flaky substrate is not particularly limited. A glass composition containing silicon oxide as a main component and further containing other metal oxides such as aluminum oxide, calcium oxide, and sodium oxide is typically used. The term "main component" is used herein to refer to a component whose content is highest in terms of mass. Examples of glass compositions include soda-lime glass, A-glass, C-glass, E-glass, borosilicate glass, and aluminosilicate glass.

The glass flake preferably has an average particle diameter of 1 to 1000 µm, even 3 to 500 µm, and particularly 3 to 200 µm. The average particle diameter of the glass flake is determined as a particle diameter (D50) at 50% by volume in a cumulative undersize distribution of light scattering-based particle sizes measured by laser diffractometry. The preferred thickness of the glass flake is 0.1 to 50 µm, in particular 0.1 to 10 µm. At least the widest value ranges of these are also a preferred average particle diameter and preferred thickness of the flaky substrate other than the glass flake.

Glass flakes can be produced, for example, by a blowing process. The blowing process includes: melting glass cullet; discharging the molten glass continuously through a circular slit while blowing a gas such as air to the molten glass from a blowing nozzle provided inwardly of the circular slit to inflate the molten glass into a balloon; and crushing the inflated, thinned glass into flakes (scaly particles). Examples of glass flakes that can be used include commercially-available glass flakes sold as "GLASFLAKE" (registered trademark) by Nippon Sheet Glass Co., Ltd.

The surfaces of glass flakes are smoother, and more apt to reflect light without scattering, than the surfaces of crystalline particles such as mica. Additionally, glass flakes are transparent, and a glitter pigment including a glass flake as a substrate is thus less likely to produce opaque reflected color which may be observed when translucent crystalline particles are used. A glitter pigment including a glass flake as a substrate is likely to provide favorable light reflection properties leading to appearance features such as high brightness and clear sparkles.

(Optical Interference Film)

The optical interference film is a film for imparting interference color to reflected light by an optical interference effect. Examples of the optical interference film include films including at least one oxide selected from titanium oxide, silicon oxide, aluminum oxide, iron oxide, zinc oxide, tin oxide, zirconium oxide, cerium oxide, nickel oxide, chromium oxide, and vanadium oxide, and films composed of the at least one oxide. Oxide names are used herein in referring to all compounds known by the names regardless of the oxidation number of metal elements. For example, the word "iron oxide" collectively refers to $Fe_2O_3$, $Fe_3O_4$, and FeO.

The optical interference film may be a single-layer film or multi-layer film. A preferred single-layer optical interference film is a titanium oxide film. Titanium oxide has a high refractive index and is suitable for forming a layer with desired color formation performance. Titanium oxide can have three types of crystal structures, namely the anatase-type, brookite-type, and rutile-type structures, and anatase-type titanium oxide and rutile-type titanium oxide are industrially manufactured. The rutile-type structure is preferred among the crystal structures of titanium oxide. Rutile-type titanium oxide has a low photocatalytic activity and thus has a low impact on a matrix material, such as a paint, to which the glitter pigment is added. Rutile-type titanium oxide has the highest refractive index.

The formation of a rutile-type titanium oxide film on the flaky substrate may be carried out according to a method disclosed, for example, in JP 2001-031421 A or JP 2003-012962 A. In the method disclosed in these patent publications, rutile-type titanium oxide is precipitated on glass flakes in a solution containing a titanium compound such as titanium tetrachloride, and thus a film is formed on the glass flakes. The precipitation of rutile-type titanium oxide on the glass flakes can be caused by adding an alkaline compound or alkaline solution to the titanium compound-containing solution having a temperature of 55 to 85° C. and a pH of 1.3 or less. Preliminarily attaching tin or a tin compound to the glass flakes facilitates the precipitation of rutile-type titanium oxide. This method can be used also to form a rutile-type titanium oxide film over glass flakes to which fine gold particles have been attached. With the use of this method, a rutile-type titanium oxide film can be formed without the need for heating for crystal transformation.

Glass flakes with a rutile-type titanium oxide film formed on the surfaces thereof are sold as "METASHINE (registered trademark) Titania Coat" by Nippon Sheet Glass Co., Ltd. Such a commercially-available product may be used as a substrate pigment.

Due to optical interference by the titanium oxide film, an interference color depending on the thickness of the titanium oxide film is observed on the flaky substrate with the titanium oxide film formed thereon. The titanium oxide film formed on a glass flake presents a yellow interference color at a thickness of about 100 nm, a red interference color at a thickness of about 130 nm, a blue interference color at a thickness of about 160 nm, and a green interference color at a thickness of about 175 nm. Depending on the layer formation conditions and other factors, the color produced by the titanium oxide film may slightly vary even when the thickness of the film is unchanged.

The optical interference film that is a multi-layer film is configured, for example, by laminating the exemplary films described above as single-layer films. It is preferable that the multi-layer optical interference film also include a titanium oxide layer. Examples of a laminate structure of a substrate pigment including the multi-layer optical interference film is shown below.

Flaky substrate/silicon oxide/titanium oxide
Flaky substrate/silicon oxide/iron oxide
Flaky substrate/silicon oxide/titanium oxide/iron oxide
Flaky substrate/silicon oxide/titanium oxide/aluminum oxide
Flaky substrate/silicon oxide/titanium oxide/silicon oxide/titanium oxide
Flaky substrate/titanium oxide/iron oxide
Flaky substrate/titanium oxide/aluminum oxide
Flaky substrate/titanium oxide/silicon oxide/titanium oxide
Flaky substrate/tin oxide/titanium oxide
Flaky substrate/aluminum oxide/titanium oxide
Flaky substrate/iron oxide/titanium oxide Each layer may be formed by a known method.

In the above laminate structures, "/" represents a boundary between two of the layers. The layers referred to by the oxide names shown above may include the corresponding oxides as a main component or may be composed of the corresponding oxide. The optical interference film is preferably formed to cover the entire surface of the flaky substrate. For convenience, however, a multi-layer film on only one principal surface of the flaky substrate is described above.

(Fine Light Scattering Particles)

Interference color produced by multiple interference in the optical interference film varies depending on the angle of observation because a distance that light goes to pass through the film changes depending on the angle of light incident on the optical interference film. The color variation (color travel) depending on the angle of observation not only can attract an observer's attention but also can be a cause of an unnatural impression. Therefore, in some applications typified by cosmetics, the color travel of the glitter pigment is desirably made smaller. Production of reflected light having a color similar to that of an interference light toward a regular reflection direction relatively reduces an influence of the variation of interference light, and the reduction results in a relatively small color travel. Reflected light other than interference light includes scattered light produced by fine metal particles disclosed in Patent Literatures 1 and 2. The method involving addition of fine metal particles is a technique developed to enhance the vividness of reflected light, and is also effective in reducing a color travel. However, the present inventor has confirmed that when a color travel is made smaller by making interference light and scattered light have similar colors according to this method, a variation $\Delta L^*$ in brightness $L^*$ of reflected light increases with a change in the angle at which the film is observed. If the variation in brightness is increased too much in exchange for a reduction in color variation, an observer is still given an unnatural impression.

According to the investigation by the present inventor, the variation, resulting from addition of fine metal particles, in brightness of reflected light can be reduced by suppressing aggregation of the fine metal particles on the surface of a substrate pigment. One specific method for preventing partial aggregation of fine metal particles is to improve the dispersibility of colloidal particles in a colloidal metal solution serving as a source of the fine metal particles. From this point of view, the colloidal metal solution suitably has a large absolute value of zeta potential, which is a measure of the stability of the colloidal particles.

The zeta potential of a commercially-available colloidal metal solution containing small-diameter colloidal particles is not sufficiently large. When a commercially-available colloidal solution containing colloidal metal particles with a particle diameter of about 10 nm or less is sufficiently diluted to have a pH of 7, the absolute value of the zeta potential of the commercially-available colloidal solution is measured to be roughly less than 40 mV. To reduce the variation in brightness of reflected light, the absolute value of the zeta potential of a colloidal solution measured in the same manner as above is desirably about 50 mV or more, albeit depending on the kind of fine particles therein. However, the absolute value of the zeta potential of a commercially-available colloidal metal solution is generally smaller than this when the colloidal particles therein have a particle diameter of about 50 nm or less. Possible factors of the small absolute value of the zeta potential of the commercially-available product are that a dispersant is less likely to be attached to the fine colloidal particles and that in common applications, the absolute value of zeta potential is not desired to be so large as described above. Therefore, in the case of a colloidal metal solution, the use of a commercially-available product as is makes it impossible to maintain a sufficiently good dispersion state of the fine metal particles therein on the surface of a substrate pigment. An example of production of a colloidal metal solution capable of sufficiently preventing aggregation of fine particles therein is described in EXAMPLES.

The zeta potential of a colloidal solution depends not only on the particle diameters of the colloidal particles in the colloidal solution but also on the pH of the colloidal solution. Commonly, the zeta potential of a colloidal solution containing colloidal metal particles decreases as the pH of the colloidal solution increases. For example, Table 2 of JP 2011-190535 A discloses separately prepared (not commercially-available) colloidal silver solutions whose zeta potential decreases down to about −24 mV to about −44 mV with increasing pH. However, this colloidal silver solution has a zeta potential of about −44 mV only when the pH of the colloidal silver solution is 10. When the pH of the colloidal silver solution is around 7, the colloidal silver solution has a zeta potential of about −38 mV.

Partial aggregation of fine metal particles can produce a preferable result (Patent Literature 2) in terms of enhancing the chroma of reflected color of a glitter pigment. In terms of reducing an observation angle-dependent variation in brightness of reflected light, however, aggregation of fine metal particles should be avoided.

The fine light scattering particles may be fine particles other than fine metal particles. The fine light scattering particles can be, for example, fine particles of an inorganic compound or fine particles of an organic compound. Although not as suitable for improving the vividness of reflected light as fine metal particles such as fine gold particles, fine non-metal particles are a material suitable for reducing an observation angle-dependent variation in brightness of reflected light. Some commercially-available colloidal solutions containing fine non-metal particles have a sufficiently high absolute value (for example, 50 mV or more) of zeta potential, but others do not. When a commercially-available colloidal solution is used as a source of fine non-metal particles, an appropriate product should be selected based on the absolute value of zeta potential.

Examples of fine metal particles suitable as the fine light scattering particles include, but are not limited to, fine gold particles, fine platinum particles, and fine silver particles. Other fine particles than these may be used depending on, for example, the desired color. It should be noted that the above exemplary fine noble metal particles are less likely to be deteriorated and these materials are thus desirably used for colors obtainable by the use of these materials. For example, fine silver particles are suitable for achieving a yellow to orange color. When fine non-metal particles are used as the fine light scattering particles, it is recommended that a suitable product be selected as appropriate from commercially-available pigments by reference to the color, particle diameter, zeta potential of a colloidal solution, etc. Examples of a pigment with a yellow to red color include yellow iron oxide, red iron oxide, disazo yellow, disazo orange, naphthol red, and quinacridone red. Examples of a pigment with a bluish color include phthalocyanine blue, examples of a pigment with a greenish color include phthalocyanine green, examples of a pigment with a purplish color include dioxazine violet, and examples of a pigment with a blackish color include carbon black.

The average particle diameter of the fine light scattering particles is preferably 1 nm to 50 nm and particularly preferably 5 nm to 30 nm, and may be 10 nm to 30 nm. The average particle diameter of the fine light scattering particles attached can be measured using a transmission electron microscope (TEM). In this measurement, it is recommended to measure the diameters of, for example, 10 to 20 fine particles or preferably 100 fine particles and calculate the average of the measured diameters as the average particle diameter. Generally, assuming that the amount of the fine light scattering particles attached is the same, a higher light scattering effect can be achieved by the fine light scattering particles having smaller particle diameters. Therefore, the fine particles suitably have small particle diameters from the viewpoint of reducing the difference $\Delta L^*$ in brightness. However, the particle diameters of the fine light scattering particles are desirably not too small in terms of enhancing the brightness of reflected light toward a regular reflection direction.

In the glitter pigment, a ratio of the fine light scattering particles to a substrate pigment composed of the flaky substrate and the optical interference film is recommended to be 0.05 to 1%, even 0.1 to 0.6%, and particularly 0.15 to 0.4% in terms of mass. When too large an amount of the fine light scattering particles is attached, a coating of the particles makes it difficult to observe interference light produced by the optical interference film.

The fine light scattering particles desirably produce scattered light having a color close to a color of interference light produced by the optical interference film. Specifically, an angular difference between a hs (15) value expressed in angle and defined for a substrate pigment composed of the flaky substrate and the optical interference film in the same manner as for a h (15) value and a hue angle hf (15) expressed in angle and defined for the fine light scattering particles in the same manner as for the h (15) value is preferably 60° or less, more preferably 40° or less, and, for example, 0° to 20°.

(Glitter Pigment)

Reflected light, as measured using illuminant D65, of the glitter pigment of the present embodiment is represented by an $L^*(15)$ value of more than 100, a $\Delta L^*$ (h−s) value of less than 30, and a $\Delta h$(h−s) value of less than 40° in an $L^*C^*h$ color system.

An angular representation of reflected light is based on the position shown in FIG. 1. An illuminant 1 is disposed so that light from the illuminant 1 to an object 2 will be incident on the object 2 at an incident angle of 45° and observed from a regular reflection direction consequently determined. To describe angles, the regular reflection direction is defined as 0° and the direction from which light from the illuminant 1 is incident as 90°. Light reflected in directions (highlight) near to the regular reflection direction is measured at angles of 15° and 25°, and light reflected in directions (shade) where regularly reflected light has no influence is measured at angles of 75° and 110°. The brightness and hue angle at an angle θ are respectively described as $L^*(\theta)$ and h(θ).

$L^*(15)$ refers to the brightness at an angle of 15°, and the $L^*(15)$ value is more preferably more than 100 and particularly preferably more than 105. Such a high brightness imparts "glitter" to a product to which the pigment is added. The upper limit of the $L^*(15)$ value is not limited to a particular value, and may be 115 or less.

A $\Delta L^*$(h−s) value is obtained by subtracting the brightness $L^*$(s) in shade from the brightness $L^*$(h) in highlight. The $L^*$(h) value is an average of the $L^*(15)$ value and $L^*(25)$ value, while the $L^*$(s) value is an average of the $L^*(75)$ value and $L^*(110)$ value. The $\Delta L^*$(h−s) value is preferably less than 30, more preferably less than 28, and particularly preferably less than 25. Such a small $\Delta L^*$(h−s) value and a small $\Delta h$(h−s) value as described next reduce an unnatural, quick, and observation angle-dependent change in reflected light and allow a natural glitter to be imparted to a product to which the glitter pigment is added. The $\Delta L^*$(h−s) value may be 0. In some cases, a preferable appearance can be obtained when the $\Delta L^*$(h−s) value is 15 or more.

The $\Delta h$(h−s) value is an angular difference between a hue angle h(h) in highlight and a hue angle h(s) in shade. The h(h) value is an average of the h(15) value and h(25) value, and the h(s) value is an average of an h(75) value and h (110) value. The h(h−s) value is preferably less than 40° and more preferably less than 35°, and may be less than 30°. The $\Delta h$(h−s) value is expressed as an angle of 180° or less. For example, when the h(h) value is 38 (°) and the h(s) value is 359 (°), the $\Delta h$(h−s) value is 39°, not 321°. The h(h−s) value may be 0. In some cases, a preferable appearance can be obtained when the h(h−s) value is 1 or more.

The h(15) value of the glitter pigment may be determined as appropriate depending on the intended application. For example, in cosmetic applications, the h(15) value of the glitter pigment is desirably 20 to 90 and more desirably 30 to 80 for some types of products so that a yellow to orange color will be presented. The optical interference film suitable for achieving such a hue angle is a single-layer titanium oxide film having a thickness of, for example, 105 nm to 125 nm and preferably 110 nm to 120 nm.

It is appropriate to measure the properties of reflected light from the glitter pigment in the form of a paint containing the glitter pigment dispersed in a transparent resin. Specifically, reflected light may be measured for a paint film serving as an object, made of a transparent acrylic resin paint containing the glitter pigment in an amount of 3 weight % with respect to the total weight, and formed on a white plane using a film applicator to have a thickness of (75±5) μm. In a paint film formed using a film applicator to have a thickness as specified above, the glitter pigment is aligned so that the principal surface thereof is substantially parallel to the painted surface.

(Pigment-Containing Composition and Pigment-Containing Painted Product)

The glitter pigment according to the present invention exhibits a natural color as well as high brightness in the regular reflection direction when incorporated in various compositions. In another aspect, the present invention provides a pigment-containing composition containing the glitter pigment according to the present invention. An example of the pigment-containing composition is at least one selected from a paint, ink, cosmetic, and resin composition, and is preferably a cosmetic. Examples of the resin composition include those containing a resin which is PMMA and/or polycarbonate in addition to the glitter pigment. The resin composition may be a molded product of artificial marble.

In still another aspect, the present invention provides a pigment-containing painted product including a substrate material and a paint film formed on the substrate material, the paint film containing the glitter pigment according to the present invention. The pigment-containing painted product may be painted paper. In this case, the substrate material is paper. The substrate material is not limited to paper, and may be a metal, resin, ceramic, or another material. The paint film may be composed of the pigment-containing composition according to the present invention or may be formed by applying the pigment-containing composition according to the substrate material.

Preferred embodiments and specific examples of the pigment-containing composition and the pigment-containing painted product are as disclosed in publications of patent applications previously filed by the applicant of the present invention (JP 2008-063525 A, for example), and such compositions and painted products themselves are well-known. Descriptions of the composition and the painted product are therefore omitted herein, and only the cosmetic will be described.

Examples of the cosmetic include facial cosmetics, makeup cosmetics, and hair cosmetics. In particular, the glitter pigment according to the present embodiment is particularly suitable for use in makeup cosmetics such as eye shadow, nail enamel, eyeliner, mascara, lipstick, and fancy powder. The form of the cosmetic is not particularly limited, and the cosmetic may be, for example, in the form of a powder, cake, pencil, stick, ointment, liquid, emulsion, or cream. Cosmetics to which the present embodiment is particularly preferably applied are facial cosmetics such as foundation and face powder.

EXAMPLES

Example 1

Fine Silver Particles

To a 1 L beaker were added 179.1 g of 3-amino-1-propanol (manufactured by Tokyo Chemical Industry Co., Ltd.), 249.9 g of pure water, 12.1 g of casein (manufactured by KISHIDA CHEMICAL Co., Ltd.), which were stirred. To the mixture was added a mixture of 2.18 g of silver nitrate (manufactured by Ohura Precious Metal Industry Co., Ltd.) and 200 g of pure water, and the contents were stirred. Subsequently, a mixture of 0.16 g of dimethylamine borane (manufactured by Wako Pure Chemical Industries, Ltd.) and 200 g of pure water was added and the contents were stirred for 30 minutes. Acetic acid was added to the mixture to adjust the pH to 4.4 and precipitate silver. The supernatant was removed, and the precipitate was washed with pure water. This was followed by addition of 500 ml of a 2% aqueous ammonia solution and stirring to disperse silver. A colloidal silver solution was thus obtained.

An amount of 12.5 g of the colloidal silver solution produced above, 50 g of pure water, and 5 g of a substrate pigment were added to a beaker. The substrate pigment used is a glass flake on which a rutile-type titanium oxide film having a thickness of about 110 nm is formed. The glass flake composing this substrate pigment has an average particle diameter of about 15 μm and a thickness of about 0.3 μm. Hydrochloric acid was added to adjust the pH to 2.0 to 4.5 while the colloidal silver solution and substrate pigment were stirred in the beaker using a stirring blade. The mixture was stirred for 10 minutes. After that, a glitter pigment was separated from the supernatant by filtration and dried at 180° C. for 12 hours. A glitter pigment was thus obtained.

Example 2

Fine Yellow Iron Oxide Particles

A colloidal solution, EMF OCHER HL (manufactured by TOYO INK CO., LTD.), was diluted with pure water to have a pigment concentration of 0.5%. A glitter pigment was obtained in the same manner as in Example 1, except that 1.0 g of this 0.5% colloidal solution, 50 g of pure water, and 2 g of the substrate pigment were used.

Example 3

Fine Disazo Yellow Particles

A colloidal solution, EMF YELLOW HG (manufactured by TOYO INK CO., LTD.), was diluted with pure water to have a pigment concentration of 0.3%. A glitter pigment was obtained in the same manner as in Example 1, except that 1.7 g of this 0.3% colloidal solution and 2 g of the substrate pigment were used.

Example 4

Fine Naphthol Red Particles

A colloidal solution, EMF RED HR (manufactured by TOYO INK CO., LTD.), was diluted with pure water to have a pigment concentration of 0.5%. A glitter pigment was obtained in the same manner as in Example 1, except that 1.0 g of this 0.5% dispersion and 2 g of the substrate pigment were used.

Comparative Example 1

Fine Silver Particles

A glitter pigment was obtained in the same manner as in Example 1, except that 500 ml of a 0.4% aqueous ammonia solution was added instead of 500 ml of the 2% aqueous ammonia solution to produce a silver colloid.

Comparative Example 2

Fine Gold Particles

An amount of 100 g of chloroauric acid tetrahydrate (a powder, manufactured by Ohura Precious Metal Industry Co., Ltd. and having a purity of 99.0% or more) was diluted with 480 g of water to prepare a 8.24 wt % chloroauric acid solution. Additionally, sodium citrate (manufactured by Nacalai Tesque Inc.) was diluted with pure water to prepare a 10 wt % sodium citrate solution. A 1 L round-bottom flask was charged with 2.0 g of the 17.24 wt % chloroauric acid solution and 994.99 g of pure water, and the contents of the flask were heated under reflux at a constant temperature of 100° C. for 30 minutes. Subsequently, 3.01 g of the 10 wt % sodium citrate solution was added to the round-bottom flask, and the contents of the flask were heated under reflux at a constant temperature of 100° C. for another 30 minutes, after which the round-bottom flask was cooled to room temperature in water, giving a colloidal gold solution.

A glitter pigment was obtained in the same manner as in Example 1, except that 10 g of the colloidal gold solution produced above and 2 g of the substrate pigment were used.

A coated product in which a powder of the glitter pigment obtained in each of Examples and Comparative Examples above is dispersed in a transparent acrylic resin was produced. A film applicator (Doctor Blade, manufactured by YASUDA SEIKI SEISAKUSHO, LTD.) was used to produce the coated product. A coating composition to be loaded into the film applicator was prepared by mixing the powder with a transparent acrylic resin paint (N ACRYL AUTO CLEAR SUPER, manufactured by NIPPON PAINT Co., Ltd.) so that the content of the powder would be 3 mass % with respect to the total mass. The coating composition was applied to a piece of white paper and dried at ordinary temperature. The paint film, which was formed to have a thickness of 9 mil (about 228.6 μm), had a thickness of 70 to 80 μm after the drying. The L*(15) value of a white plane provided by the white paper was 94.1.

The brightness L* and hue angle h of each coated product formed were measured using a multi-angle spectrocolorimeter, BYK-mac (manufactured by BYK-Gardner GmbH), with an illuminant being disposed so that light would be incident on the coated product at an incident angle of 45°. The illuminant used is illuminant D65. The measurement was performed at angles of 15°, 25°, 75°, and 110° in accordance with the angular representation described above. Additionally, the fine light scattering particles used in Examples and Comparative Examples were measured for the hue angle. The fine particles were diluted to a concentration of 0.1% and then put in a transparent glass container for this measurement performed using a spectrocolorimeter (CM-5 manufactured by KONICA MINOLTA, INC.). The measurement angle was 15° in accordance with the angular representation described above.

Moreover, the zeta potential of the colloidal solutions brought in contact with the substrate pigment was measured using a zeta potential measurement apparatus (ELS-6000 manufactured by Otsuka Electronics Co., Ltd.). The zeta potential measurement was performed for the colloidal solutions each diluted 10000-fold with pure water. The pH of each diluted colloidal solution was 7.

The measurement results are shown in Table 1. In Examples 1 to 4, the ΔL*(h−s) and Δh(h−s) values were both small. Therefore, reflected light achieving a high soft focus effect was observed by visual observation at different angles. High brightness was also observed from the regular reflection direction. In Comparative Examples 1 to 2, although a color shift was reduced, the difference ΔL*(h−s) in brightness depending on the angle of observation was large. Therefore, reflected light gave an indelible, artificial impression and looked slightly unnatural.

TABLE 1

| | Fine light scattering particles | Average particle diameter (nm) | Hue angle h of fine particles | Difference in h between substrate pigment and fine particles | Zeta potential (mV) | L* (15) | L* (25) | L* (75) | L* (110) | ΔL* (h − s) | h (15) | h (25) | h (75) | h (110) | Δh (h − s) |
|---|---|---|---|---|---|---|---|---|---|---|---|---|---|---|---|
| Example 1 | Silver | 10 to 20 | 79 | 6.6 | −54 | 106.7 | 93.8 | 77.4 | 74.4 | 24.4 | 67.65 | 67.94 | 72.70 | 69.18 | 3.1 |
| Example 2 | Yellow iron oxide | 30 | 80.9 | 8.5 | −56.8 | 114.1 | 101.1 | 86.2 | 83.6 | 22.7 | 76.91 | 81.77 | 114.08 | 109.08 | 32.2 |
| Example 3 | Disazo yellow | 30 | 86.3 | 13.9 | −63.2 | 111.4 | 98.2 | 82.6 | 80.0 | 23.5 | 81.28 | 85.07 | 97.15 | 95.59 | 13.2 |
| Example 4 | Naphthol red | 30 | 33.2 | 39.2 | −60.4 | 103.9 | 89.5 | 71.6 | 68.7 | 26.6 | 47.13 | 40.60 | 15.26 | 14.12 | 29.2 |
| Comparative Example 1 | Silver | — | 79 | 6.6 | −18 | 96.8 | 78.7 | 52.1 | 48.3 | 37.6 | 65.43 | 63.55 | 46.13 | 43.05 | 19.9 |
| Comparative Example 2 | Gold | 10 | 10.2 | 62.2 | −40 | 99.4 | 82.3 | 59.9 | 56.3 | 32.8 | 63.10 | 61.55 | 54.50 | 51.12 | 9.5 |
| Substrate pigment | — | — | — | — | — | 114.6 | 102.0 | 87.6 | 84.8 | 22.1 | 72.40 | 76.64 | 184.17 | 183.22 | 109.2 |

*Average particle diameter: Average particle diameter of the fine light scattering particles
*Difference in h between substrate pigment and fine particles: Difference between the hs (15) value of the substrate pigment and the hf (15) value of the fine light scattering particles
*Amount of the fine light scattering particles attached in each of Examples and Comparative Examples: 0.25 mass % with respect to the substrate pigment

The invention claimed is:

1. A glitter pigment, comprising:
a flaky substrate;
an optical interference film formed on a surface of the flaky substrate; and
fine light scattering particles of an inorganic compound or an organic compound attached to the optical interference film, wherein
the flaky substrate is a glass flake,
the fine light scattering particles have an average particle diameter of 1 nm to 50 nm,
reflected light, as measured using illuminant D65, is represented by an L* (15) value of more than 100, a ΔL* (h−s) value of less than 30, and a Δh (h−s) value of less than 40° in an L*C*h color system, wherein
the L* (15) value is an L* value of the reflected light toward a 15° direction based on an angular representation in which, when the illuminant is disposed so that an incident angle of incident light from the illuminant is 45°, an angle at which the incident light is regularly reflected is defined as 0° and an incident direction of the incident light is defined as 90°,
the ΔL* (h−s) value is a difference obtained by subtracting an average value L* (s) of an L* (75) value of the reflected light toward a 75° direction and an L* (110) value of the reflected light toward a 110° direction from an average value L* (h) of the L* (15) value of the reflected light toward the 15° direction and an L* (25) value of the reflected light toward a 25° direction when the directions are based on the angular representation, and the Δh (h–s) value is an angular difference between an average value h (h), expressed in angle, of a h (15) value of the reflected light toward the 15° direction and a h (25) value of the reflected light toward the 25° direction and an average value h (s), expressed in angle, of a h (75) value of the reflected light toward the 75° direction and a h (110) value of the reflected light toward the 110° direction when the directions are based on the angular representation.

2. The glitter pigment according to claim 1, wherein a ratio of the fine light scattering particles to a substrate pigment composed of the flaky substrate and the optical interference film is 0.05 to 1% in terms of mass.

3. The glitter pigment according to claim 1, wherein an angular difference between a hs (15) value expressed in angle and defined for a substrate pigment composed of the flaky substrate and the optical interference film in the same manner as for the h (15) value and a hue angle hf (15) expressed in angle and defined for the fine light scattering particles in the same manner as for the h (15) value is 60° or less.

4. The glitter pigment according to claim 1, wherein the h (15) value of the glitter pigment is 20 to 90.

5. The glitter pigment according to claim 4, wherein
the optical interference film is a titanium oxide film being a single-layer film and
the titanium oxide film has a thickness of 105 nm to 125 nm.

6. A pigment-containing composition, comprising the glitter pigment according to claim 1.

7. A pigment-containing painted product, comprising:
a substrate material; and
a paint film formed on the substrate material, the paint film containing the glitter pigment according to claim 1.

* * * * *